United States Patent
Chance

(10) Patent No.: US 10,240,763 B2
(45) Date of Patent: Mar. 26, 2019

(54) METHOD FOR ILLUMINATION OF OUTDOOR COOKING GRILL SURFACE

(71) Applicant: Michael Chance, Suwanee, GA (US)

(72) Inventor: Michael Chance, Suwanee, GA (US)

( * ) Notice: Subject to any disclaimer, the term of this patent is extended or adjusted under 35 U.S.C. 154(b) by 0 days.

(21) Appl. No.: 15/596,182

(22) Filed: May 16, 2017

(65) Prior Publication Data

US 2017/0248295 A1 Aug. 31, 2017

Related U.S. Application Data

(63) Continuation of application No. 13/623,447, filed on Sep. 20, 2012, now abandoned.

(51) Int. Cl.
*F21V 21/088* (2006.01)
*A47J 37/07* (2006.01)
*F21L 4/00* (2006.01)
*F21V 33/00* (2006.01)

(52) U.S. Cl.
CPC ....... *F21V 21/0885* (2013.01); *A47J 37/0704* (2013.01); *A47J 37/0763* (2013.01); *A47J 37/0786* (2013.01); *F21L 4/00* (2013.01); *F21V 33/008* (2013.01); *F21L 4/005* (2013.01)

(58) Field of Classification Search
CPC ................ A47J 37/0786; A47J 37/0704; A47J 37/0763; F21L 4/005; F21L 4/00; F21V 21/0885; F21V 33/008
USPC ....... 248/115, 213.2, 217.4, 300, 305, 316.7, 248/231.9; 362/92, 253, 249.01, 370, 362/382, 432, 190, 191
See application file for complete search history.

(56) References Cited

U.S. PATENT DOCUMENTS

| | | | | |
|---|---|---|---|---|
| 442,270 A | * | 12/1890 | Marshall | B60T 17/046 248/300 |
| 970,854 A | * | 9/1910 | Schwartz | B60T 17/046 248/300 |
| 1,341,113 A | * | 5/1920 | Dottl | F16L 3/24 248/300 |
| 1,371,622 A | * | 3/1921 | Hudson | B60K 5/12 248/672 |
| 1,635,847 A | * | 7/1927 | Hooper | B60K 5/12 248/672 |
| 1,695,987 A | * | 12/1928 | Steindorff | F21L 14/02 248/229.16 |

(Continued)

*Primary Examiner* — Muhammad Ijaz
(74) *Attorney, Agent, or Firm* — J.T. Hollin, Attorney at Law, P.C.

(57) ABSTRACT

Disclosed is a method for providing immediate, direct illumination of the cooking surface of an outdoor cooking grill. The method employs the installation of a one-piece metallic light fixture holder attachable to cooking grills which have a hinged, curvilinear grill cover. The light fixture holder comprises a rigid, symmetrically-bent channel member, at least one horizontally-oriented curvilinear attachment arm, fastening tabs, and at least one pre-drilled hole in each fastening tab, said holes, corresponding to holes commonly used to attach a handle to a grill cover. The pre-drilled holes of the fastening tab of the light fixture holder allow the light fixture holder to be easily fastened and co-located in holes provided for the original manufacturer's grill cover handle. An appropriately-sized LED or battery-powered light fixture is then securely placed within the channel segment of the light fixture holder.

3 Claims, 6 Drawing Sheets

(56) References Cited

U.S. PATENT DOCUMENTS

| | | | | |
|---|---|---|---|---|
| 1,805,742 | A * | 5/1931 | Reynolds | A47H 1/142 248/251 |
| 2,041,332 | A * | 5/1936 | Golden | F21L 15/08 248/229.1 |
| 2,855,107 | A * | 10/1958 | Roth | B25H 3/00 211/120 |
| D184,508 | S * | 3/1959 | Burt | 248/214 |
| 3,992,618 | A * | 11/1976 | Matthews | F21V 21/08 362/396 |
| 4,121,798 | A * | 10/1978 | Schumacher | A47L 13/512 24/336 |
| D289,233 | S * | 4/1987 | Cadman | D6/310 |
| 5,257,169 | A * | 10/1993 | Walendziak | A45C 15/06 126/213 |
| 5,678,790 | A * | 10/1997 | Dwyer | A47G 21/145 211/70.7 |
| 5,816,684 | A * | 10/1998 | Yu | F21V 21/06 362/191 |
| 5,823,483 | A * | 10/1998 | Gaskill | A47J 43/287 248/37.6 |
| 5,921,520 | A * | 7/1999 | Wisniewski | F16L 3/12 248/300 |
| 6,056,414 | A * | 5/2000 | Krieger | F21L 2/00 362/184 |
| D430,699 | S * | 9/2000 | Coleman | D26/138 |
| 6,132,055 | A * | 10/2000 | Grisamore | A47J 37/0704 362/253 |
| 6,494,594 | B1 * | 12/2002 | Schroetter | F21V 21/088 362/249.01 |
| 6,935,327 | B1 * | 8/2005 | Williams | A47J 36/06 126/19 R |
| 7,131,170 | B2 * | 11/2006 | Weaver | A46B 17/02 24/545 |
| 7,178,776 | B2 * | 2/2007 | Buck | F16L 3/1008 174/541 |
| 7,222,620 | B2 * | 5/2007 | Wolter | F21V 21/26 126/213 |
| 7,530,537 | B2 * | 5/2009 | Kandah | B65B 67/1216 220/482 |
| 7,572,024 | B2 * | 8/2009 | Ko | A47J 37/0786 126/213 |
| 8,424,826 | B2 * | 4/2013 | Santos | F16M 13/022 248/200 |
| 8,545,041 | B2 * | 10/2013 | Brown | A42B 1/24 24/336 |
| 2004/0001334 | A1 * | 1/2004 | Choi | A47J 37/0786 362/127 |
| 2004/0228117 | A1 * | 11/2004 | Witzel | A47J 37/0786 362/92 |
| 2009/0097263 | A1 * | 4/2009 | Ko | A47J 37/0786 362/372 |
| 2010/0254123 | A1 * | 10/2010 | Brown | A42B 1/24 362/191 |
| 2011/0001026 | A1 * | 1/2011 | Kubsad | A47B 96/067 248/223.41 |

* cited by examiner

METHOD FOR ILLUMINATION OF OUTDOOR COOKING GRILL SURFACE

CROSS-REFERENCES TO RELATED APPLICATIONS

This is a continuation-in-part patent application and claims the benefit and priority of parent U.S. patent application Ser. No. 13/623,447 filed on Sep. 20, 2012, and currently co-pending before the USPTO, by reference as though said parent application appears fully herein.

STATEMENT REGARDING FEDERALLY SPONSORED RESEARCH OR DEVELOPMENT

Not applicable.

BACKGROUND OF THE INVENTION (1) Field of the Invention

The lighting of most household barbecue grills so as to permit the cooking surface to be viewed at night has presented considerable difficulties. Some approaches have included the provision of a tripod with lights mounted on it, the attaching of a light to a nearby post or wall, or the attaching of a clamp-on bendable extension light to a nearby tray or other physical object. In addition to being cumbersome, awkward and expensive, such lighting arrangements are typically positioned such that shadows are cast on the cooking surface so as to obscure the desired view of food items being cooked. The present inventive concept presents a method by which a user may directly provide a source of light to the cooking surface of certain types of household cooking grills.

(2) Description of the Related Art, including information disclosed under 37 CFR 1.97 and 1.98.

U.S. #2011/0273887 A1 (Nov. 10, 2011) The invention is a lighting assembly for an outdoor grill or similar type of cooking assembly includes a base having a first end mountable within a receptacle located along a surface of the grill. An illumination source is located at a second end of the base. A directional cap is applied over the illumination source and redirects the light provided by the illumination source toward a desired area or areas of a cooking surface or preparation area of the grill.

U.S. Pat. No. 7,572,024 B2 (Aug. 11, 2009) Disclosed is a variably-adjustable grill light with a lamp portion having pitch, roll and/or yaw adjustability, along with a telescopic arm, wherein the grill light can be installed and then selectively adjusted without the need for removal so that it will shine on any selected portion of the grill, or, alternately, the lamp portion can be removed without removing the clamp from the handle for portable use or to shine on other surfaces. This provides a grill user with the ability to easily see the condition of the food being cooked and provides visibility during application of spices, sauces or other condiments.

U.S. Pat. No. 7,810,967 B2 (Oct. 12, 2010) An adjustable grill light having a lamp portion with light emitting diodes, a lens and a reflector, a gooseneck extension, and an adjustable clamp comprised of two members hingedly joined and locked together. After unlocking, the two members are secured in a selected position by a scoverable plate, a fixed plate and a brace hingedly joined therebetween. Further, a timer controls the period during which the grill light is illuminated.

U.S. Pat. No. 7,222,620 B2 (May 29, 2007) The invention is a lighting assembly for a cooking apparatus including a handle, an arm and a light source. The arm is movably joined with the handle so that the arm is selectively movable from a position in which it is concealed at least partially in the handle to another position where the arm projects out from the handle and over a cooking surface when a cover of the cooking apparatus is in an open position. By adjusting the position of the arm, the light source can be aimed at the surface to monitor the cooking of food in low light conditions.

U.S. Pat. No. 7,008,072 B2(Mar. 7, 2006) Disclosed is a light assembly for a barbecue grill has a body with an extension at one end and a light at the other end. The barbecue grill has a hollow handle extending from one side of a cover. The handle is hollow and the extension is sized to fit with the handle. The light assembly and barbecue grill are used in combination.

U.S. 6,935,327 B1 (Aug. 30, 2005) Shown is a handle and light assembly for use on a barbecue grill. The assembly is inclusive of handle and at least one source of illumination for illuminating a cooking surface inside a hollow cooking chamber of the barbecue grill. The handle may function both as a means for opening a cover to access the cooking surface and also as a compartment for retaining the energy used to power the source of illumination. The cover includes at least one channel for the appropriate wiring to extend from the energy compartment to the illumination source. Accordingly, the handle may be located on the outside of the grill cover, and the source of illumination may be located inside the hollow cooking chamber.

U.S. Pat. No. 6,851,820 B2 (Feb. 8, 2005) A light for a barbecue grill is provided. The light has a housing mounted to the cover of a barbecue grill, and the housing contains a light source, a power source, a controller and a switch. The switch may be a manual switch or an automatic tilt switch. The switches manipulate illumination of the light sources when the cover of the barbecue grill is opened.

U.S. Pat. No. 6,132,055 (Oct. 17, 2000) A handle assembly mountable to a barbecue cover and which includes an integral light positioned to shine upon the cooking surface of the barbecue when the barbecue cover has been so positioned as to expose the cooking surface.

U.S. Pat. No. 6,073,623 (Jun. 13, 2000) A barbecue grill having a cooking surface and a retractable light mounted to an upper portion of the lower grill housing and moveable between a first operable position and a second stored position. In the operable position the light is oriented to illuminate the cooking surface of the grill. In the stored position, the top surface of the light is substantially aligned with the cooking surface and the top surface of an auxiliary shelf attached to the grill. The light may also be supplied separately for retrofit on any existing grill.

BRIEF SUMMARY OF THE INVENTION

The inventive concept disclosed is a method by which a user may directly provide a source of light to the cooking surface of certain types of household cooking grills. In its preferred embodiment, the disclosed method provides a means for providing nighttime illumination to a variety of "kamado" style grills, including a wide selection of styles available in many consumer models. The disclosed method may be modified so as to utilize two basic embodiments to provide a source of light.

Each embodiment utilized to perform the method comprises a rigid, symmetrically-bent channel member, at least one horizontally-oriented fastening tab, and at least two pre-drilled holes in each fastening tab, said holes, corresponding to the spacing of fastening holes commonly used to attach a handle to the hinged cover of a cooking grill. The pre-drilled holes of the fastening tab allow either of the embodiments to be easily fastened, by means of bolts or machine screws, to the grill cover.

The light fixture holder is thereupon fastened onto the grill cover by utilizing the same holes, and most likely the same machine screws or bolts, which previously anchored the grill cover handle. An appropriately-sized LED or battery-powered light fixture is then placed within the clutching member of the light fixture holder. In this manner, the user, upon grasping the newly-installed light fixture holder, thereby performs two functions: 1) opening the cover to tend to the grilling food, and 2) during nighttime, providing illumination for the grill cooking surface.

Figure 1:
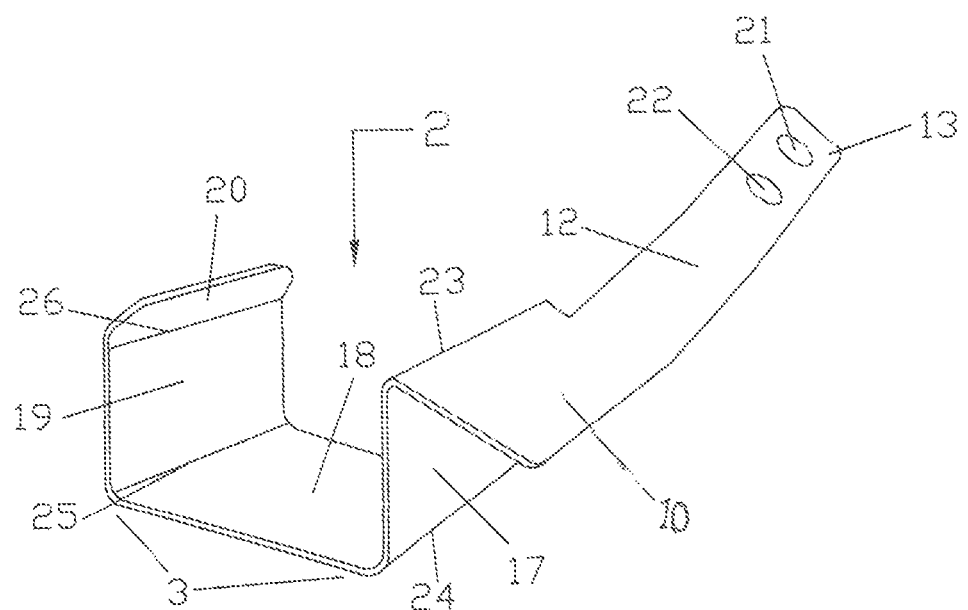
FIG. 1 presents a perspective view of a single-arm light fixture holder 2.

Table of Nomenclature & Part Numbers of Inventive Concept

1. Dual-arm light fixture holder
2. Single-arm light fixture holder
3. Channel
4.-9. n/a
10. Shoulder
10(b) Right shoulder
11. Right attachment arm
12. Left attachment arm
13. Right fastening tab
14. Left fastening tab
15. Right slot
16. Left slot
17. Upper flange
18. Bracket
19. Lower flange
20. Lip
21. First hole
22. Second hole
23. Fourth junction
24. Third junction
25. Second junction
26. First junction
27. Fifth junction
28. Sixth junction
29.-39. n/a
40. Cover
41. Lower member
42. Cooking surface
43. Handle
44. n/a
45. Outer rim
46. Hole for left leg
47. Hole for right leg
48. Hinge Table of Nomenclature & Part Numbers of Inventive Concept 49. Tab fasteners
50. Light fixture

DETAILED DESCRIPTION OF THE INVENTIVE CONCEPT

The description of the components and performance of the inventive method will be discussed with reference to the drawing figures herein. Beginning with FIG. 1, there is shown a single-arm light fixture holder 2. The single-arm light fixture holder 2 shown is fabricated from a single pre-cut, planar sheet of metal or other material. The preferred embodiment of the single-arm light fixture holder 2 is constructed from 16 gauge steel. For the sake of clarity, the starting form for the light fixture holder 2 shall be referred to in this disclosure as "sheet metal." However, various types of metals, composite materials, or other substances having different gauges, thicknesses or sizes may be used in the fabrication of the inventive concept. The single-arm light fixture holder 2 in FIG. 1 comprises a right arm 12, although a single-arm light fixture holder 2 may be fabricated with either a right arm or a left arm component.

The single-arm light fixture holder 2 is fabricated with the capability to clasp an appropriately-sized portable, battery-powered light 50 or LED (not shown) within a formed channel 3. The channel 3 is created by the bends created at four parallel junctions (23, 24, 25, and 26) resulting from the bending of various sections of the pre-cut sheet. Viewing FIG. 1, there is observed a first junction 26, which, upon being bent at an approximate 45 degree angle, forms a lip 20 and one end of a lower flange 19. The lower flange 19 extends to a second junction 25, at which junction the sheet metal is bent at an approximate inward angle of 85 degrees, thereby defining the second end of the lower flange 19 and also defining one end of a bracket 18 component. The opposite end of the bracket 18 is formed at a third junction 24 at which the sheet metal is bent inwardly at an approximate angle of 85 degrees, also resulting in the formation of one end of an upper flange 17. The second end of the upper flange 17 is created at a fourth junction 23 which is formed by an approximately 80 degree outward bend of the sheet metal.

Continuing at FIG. 1, it can be seen that, at the fourth junction 23, a shoulder 18 segment is created. The shoulder 10 is oriented at an acute outward angle relative to the upper flange 17. The shoulder 10 extends a distance, parallel to the fourth junction 23, to form a right attachment arm 12. By the same token, the shoulder 10 can extend in the opposite direction, parallel to the fourth junction 23 to form a left attachment arm 11 (not shown). Either or both of the left and right attachment arms 11, 12 may be bent in any curvilinear or angular manner to facilitate the fit of one or both attachment arm(s) to the outer rim of a cooking grill cover 40.

Again referring to FIG. 1, there is shown extending outward from the right attachment arm 12, a right fastening tab 13. The right fastening tab 13 is drilled with two holes 21, 22 which correspond to the spacing of at least one hole routinely found drilled through the outer rim of cooking grill covers 40. The two drilled holes 21, 22 also, may accordingly correspond to the spacing of holes in a handle 43

(shown in FIG. 6) typically attached to the grill cover 40 on the vast majority of cooking grills.

Figure 2:
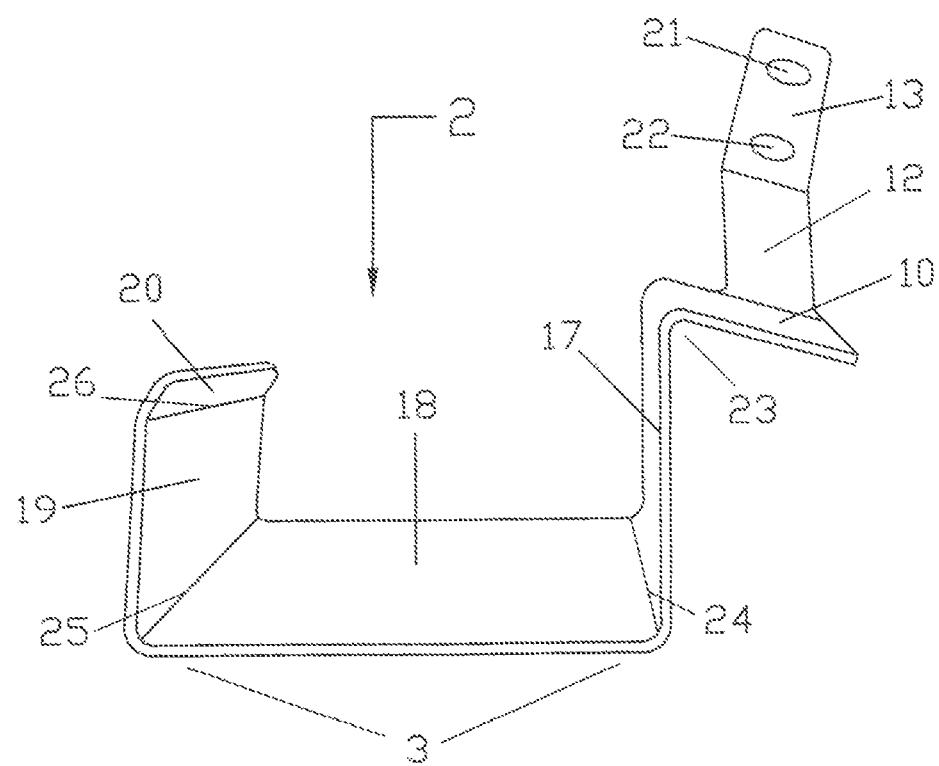
FIG. 2 depicts a predominantly side perspective view of the single-arm light fixture holder 2.

In viewing FIG. 2, there is shown a predominantly side view of the single-arm light fixture holder 2. It is to be noted that the lower flange 19 and the upper flange 17 of the channel 3 are each bent inwardly at an angle of approximately fifteen degrees in order to render a slight pre-loaded compression force upon the exterior of a light fixture 50 (not shown) which will be placed against the bracket 18 surface. The lip 20, also being angled, provides additional grasping security against the light fixture or LED 50.

Figure 3:
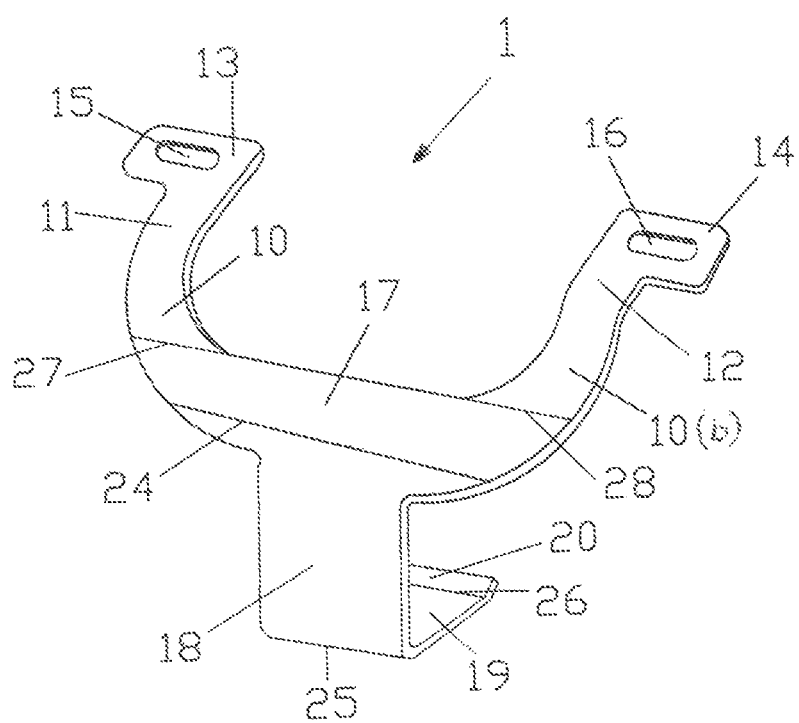
FIG. 3 illustrates a perspective view of a dual-arm light fixture holder 1.

Observing FIG. 3, there is illustrated a dual-arm light fixture holder 1. The dual-arm light fixture holder 1 is fabricated with the capability to clasp a portable, battery-powered light fixture or LED 50 (not shown) within the confines of a channel formed by an upper flange 17, a bracket 18, a lower flange 19, and a lip 20. The dual-arm light fixture holder 1 is a one-piece device formed from a single sheet of metal. The preferred embodiment of the dual-arm light fixture holder 1 is constructed from 16 gauge steel. However, various types of metals, composite materials, or other substances having different gauges, thicknesses or sizes may be used in the fabrication of the dual-arm light fixture holder 1.

Figure 4:
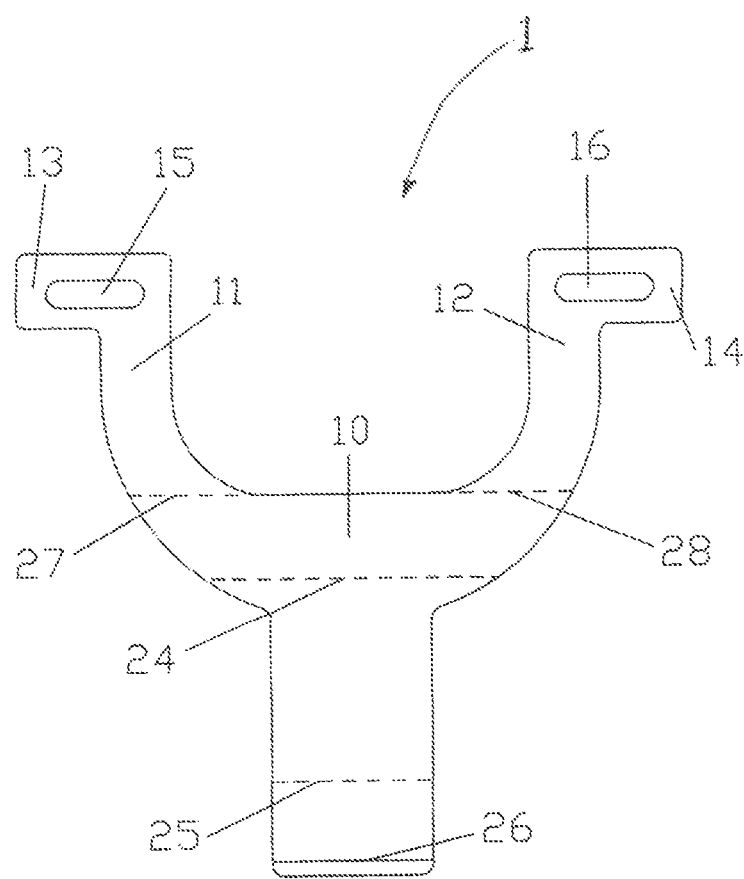
FIG. 4 is a view of the metallic form used to shape and fabricate a dual-arm light fixture holder.

FIG. 4 presents a planar shape, comprised of metal, composite material, or other substance that is the generic form used to make the various bends and junctions comprising the dual-arm light fixture holder 1. Again, referring to FIG. 3, there is observed a first junction 26, which, upon being bent at an approximate 45 degree angle, forms a lip 20 and one end of a lower flange 19. The lower flange 19 extends to a second junction 25, at which junction the sheet metal is bent at an approximate inward angle of 85 degrees, thereby defining the second end of the lower flange 19 and also defining one end of a bracket 18 component. The opposite end of the bracket 18 is formed at a third junction 24, at which the shape is bent inwardly at an approximate angle of 85 degrees, which also results in the formation of one end of an upper flange 17. The second end of the upper flange 17 is defined by a line connecting a fifth junction 27 and a sixth junction 28 which junctions are parallel and co-axial.

In FIG. 3 there is further observed that, at the fourth junction 27, a left shoulder 10 segment is created, and at the fifth junction 28, a right symmetrical shoulder 10(b) is also created. The shoulders 10, 10(b) is oriented at an acute outward angle relative to the upper flange 17. The left shoulder 10 extends a distance, at an angle to the fifth junction 27, to form a left attachment arm 11. In a similar orientation, the right shoulder 10(b) extends a distance, at an angle to the sixth junction 28, to form a right attachment arm 12. The left and right attachment arms 11, 12 are bent in a curvilinear or angular manner to facilitate the fit of both attachment arm(s) to the outer rim of a cooking grill cover 40.

FIG. 3 illustrates that the right attachment arm 12 culminates in a right fastening tab 14 which contains an oblong right slot 16. Further, the left attachment arm 11 culminates in a left fastening tab 13 which contains an oblong left slot 15. The two oblong slots 15, 16 correspond to the spacing of dual holes commonly found to attach a handle 43 to the perimeter of the outer rim 45 of grill covers 40 on the vast majority of cooking grills.

Figure 5:
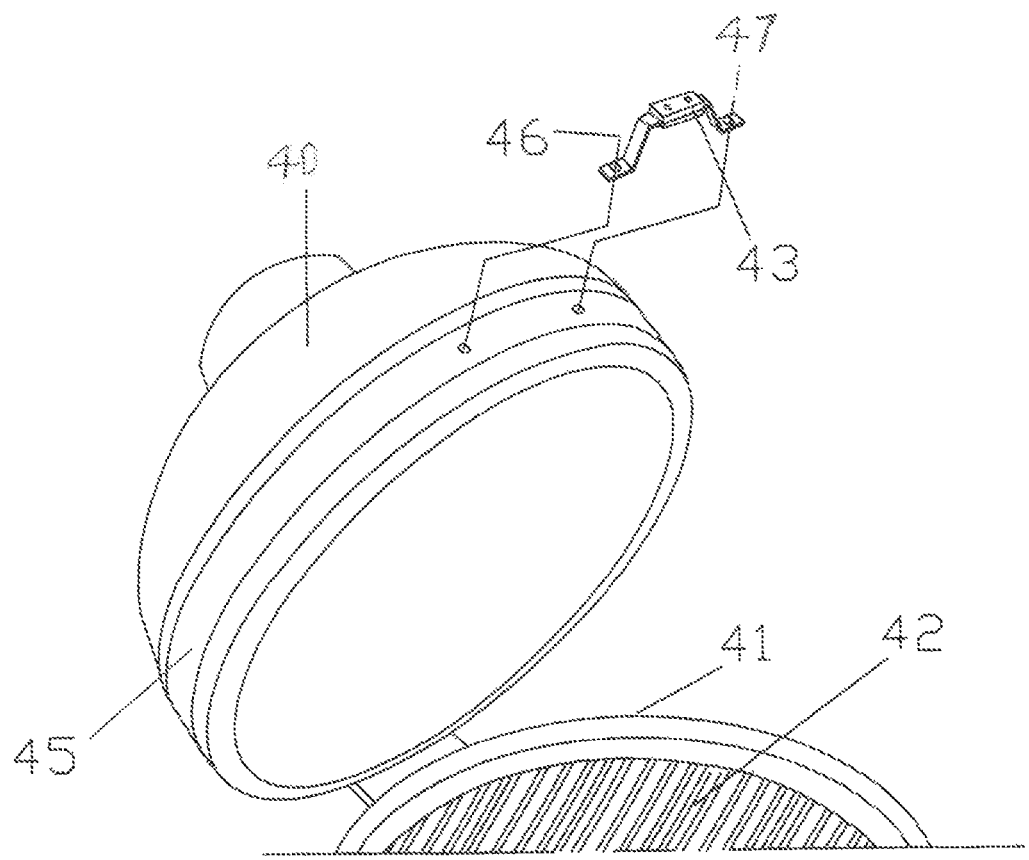
FIG. 5 shows a cooking grill cover positioned in the open position, and further, shows the grill handle detached from the outer rim of the cover.

The inventive concept is made functional starting with the first step of removing the original manufacturer's grill cover 40 handle 43 as shown in FIG. 5. Any machine screws, bolts, or other fasteners which attached the handle to the grill cover may be set aside for later use. At least one of the pre-drilled holes 21, 22 of the single-arm light fixture holder 2, or the two slots 15, 16 of the dual-armed light fixture holder 2, are positioned so as to axially align one or both of them with the holes on the rim 45 of the grill cover 40. Immediately thereafter, the holes in the grill cover handle 43 are also placed in alignment with the holes on the rim 45. [This maneuver may have to be performed on one hole at a time so as to facilitate the necessary connections].

Figure 6:
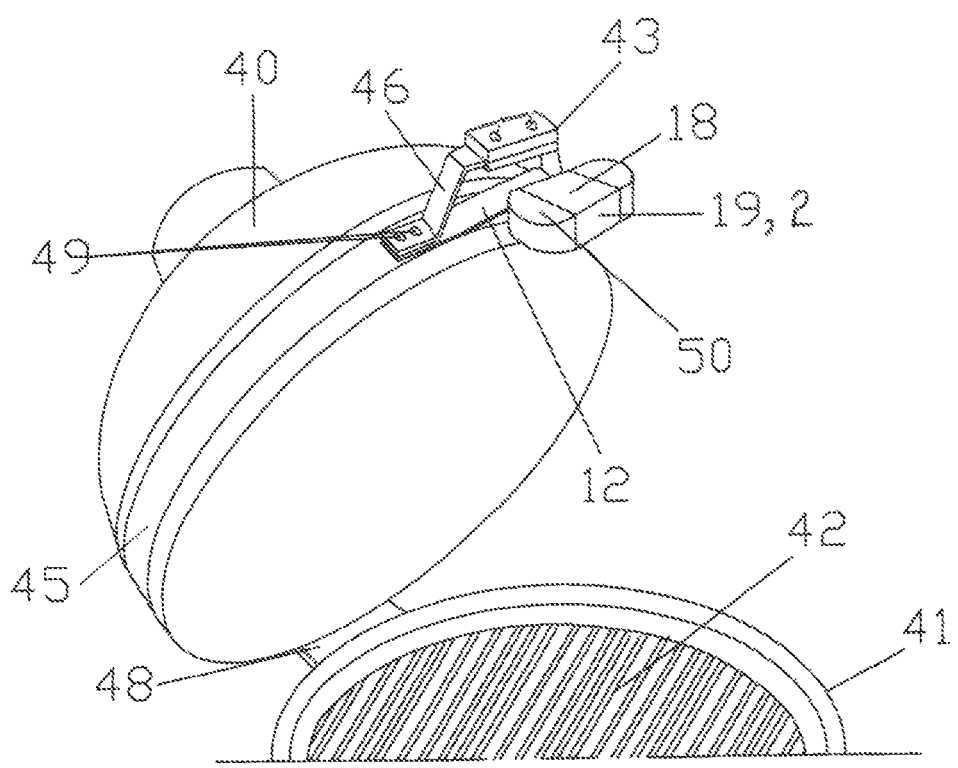
FIG. 6 displays a cooking grill with the cover 40 hinged open and having a single-arm light fixture holder attached to the outer rim of the cover.

A machine screw, bolt, or other fastener 49, as shown in FIG. 6, is then inserted through the holes of the handle 43, continuing through the pre-drilled holes of the light fixture holder 1, 2, and finally fastened to the holes 46, 47 in the grill cover 40 by means of tightening of the fasteners 49. A light fixture or LED 50 having exterior dimensions corresponding to the channel 3 of either the single-arm light fixture holder 2 or the dual-armed light fixture holder 1 is then securely placed within the confines of said channel 3, as is shown in FIG. 6. Thereupon, a user, upon grasping the handle 43 and the co-located newly-installed light fixture holder 1, 2, may perform two functions: 1) opening the cover 40 to tend to the grilling food, and 2) during nighttime, providing sufficient illumination for the grill cooking surface 42.

While preferred embodiments of the present inventive method have been shown and disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, as described by the scope of the claims presented herein.

What is claimed is:

1. A method for illuminating a cooking surface of a portable cooking grill with an immediately contiguous light source, said cooking grill having a hinged cover with a curvilinear rim, a handle, and at least two integral handle attachment holes, such a light source is provided by a method comprising:
    (a) removing the handle and all securements of the handle to the hinged cover;
    (b) providing a light fixture holder in conjunction with an integral LED or battery-powered light fixture; wherein the light fixture holder comprises an apparatus having a first member and a second member, said first member comprises a channel for clasping or retaining a light fixture within the first member; and said second member comprises a curvilinear attachment arm and at least two integral holes for attachment of the light fixture holder to the outer rim of the hinged cover of the cooking grill;
    (c) fastening the light fixture holder and the handle simultaneously onto the grill cover at the locale of the handle attachment holes;
    (d) providing a light fixture for enclosure within the light fixture holder such that when opening the hinged cover, the light fixture is aimed at the cooking surface.

2. A method for providing an immediately contiguous source of illumination of the cooking surface of an outdoor cooking grill, the grill being of the "kamado" style having a hinged cover with a curvilinear rim, a handle, and at least two handle-attaching holes integral to the curvilinear rim, the steps of the method comprising:

providing a "first member" which further comprises
(a) a metallic piece bent at various junctions into a generally rigid form and thereby forming a channel defined by an upper rectangular flange, a lower rectangular flange, and a rectangular planar bracket integrally joined to the lower edge of each the upper and lower flanges, and a shoulder joined to the upper rectangular flange of said channel;
(b) said channel being further defined by a sequential series of parallel junctions, beginning with a lip joined at approximately 45 degree inner angle with the upper edge of the lower flange, the opposite edge of said lower flange being joined at approximately 85 degree inner angle with one edge of the bracket, the opposite edge of said bracket being joined at an approximately 85 degree inner angle with the lower edge of the upper flange, and the upper edge of said upper flange being joined at approximately 75 degree angle with said shoulder, whereby said channel forms cumulative inward bending so as to provide an opening for insertion and clasping of the exterior surface of a light fixture;

providing a "second member" which further comprises
(c) a curvilinear attachment arm having a radius and curvature corresponding to the outer rim of the cooking grill, and said attachment arm integral to, and extending from said shoulder of the first member to form a fastening tab integral to the endmost section of said curvilinear attachment arm; and further,
(d) providing that said fastening tab further contains at least two holes corresponding to the dimensions and spacing of the two holes of the grill cover, whereby the second member can replace the factory-installed handle by utilization of fasteners secured through the second member, the two holes of the curvilinear rim, and directly attached to the interior surface of the curvilinear rim.

3. A method for providing an immediately contiguous source of illumination of the cooking surface of an outdoor cooking grill, the grill being of the "kamado" style having a hinged cover with a curvilinear rim, a handle, and at least two handle-attaching holes integral to the curvilinear rim, the steps of the method comprising:

(a) providing a "first member" which further comprises
a channel which consists of a sequential series of parallel junctions beginning with a lip joined at an approximately 45 degree inner angle with one edge of a rectangular lower flange, the opposite edge of said lower flange being joined at an approximately 85 degree inner angle with one edge of a rectangular bracket, the opposite edge of said rectangular bracket being joined at an approximately 85 degree inner angle with one edge of a rectangular upper flange, and the opposite edge of said upper flange culminating in adjoinment at an approximately 75 degree angle with a shoulder; and
(b) providing a second member which further comprises the continuation of the aforesaid said shoulder to form a left elongated extension manifesting in a left attachment arm, said left attachment arm further culminating in a left fastening tab, said left fastening tab having at least one hole drilled therethrough, and wherein said shoulder continues to also form a right elongated extension manifesting a right attachment arm, said right attachment arm further culminating in a right fastening tab, said right fastening tab having at least one hole drilled therethrough, whereby both the left and right fastening tabs are secured by fasteners to the curvilinear rim of the hinged cover.

* * * * *